H. LOCKE.
Improvement in Cutters for Trimming Wooden Bowls.

No. 132,090.  
Patented Oct. 8, 1872.

Witnesses:  
Jno. D. Patten  
Morris Poe

Inventor:  
Harvey Locke  
By Johnson, Klaucke &c  
his associate Attys

UNITED STATES PATENT OFFICE.

HARVEY LOCKE, OF GRAND RAPIDS, MICHIGAN.

IMPROVEMENT IN CUTTERS FOR TURNING WOODEN BOWLS.

Specification forming part of Letters Patent No. 132,090, dated October 8, 1872.

*To all whom it may concern:*

Be it known that I, HARVEY LOCKE, of the city of Grand Rapids, county of Kent, and State of Michigan, have invented certain Improvements in Cutters for Turning Wooden Bowls, of which the following is a specification:

My invention relates to an adjustable cutter in connection with a cutter-arm, for the purpose of cutting or manufacturing wooden bowls in a more perfect and finished manner, and at the same time with greater facility than can be done with the ordinary cutters now in use.

Figure 1:
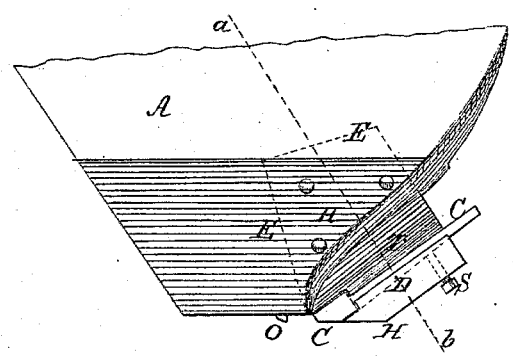
Figure 2:
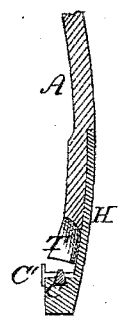
Figure 3:
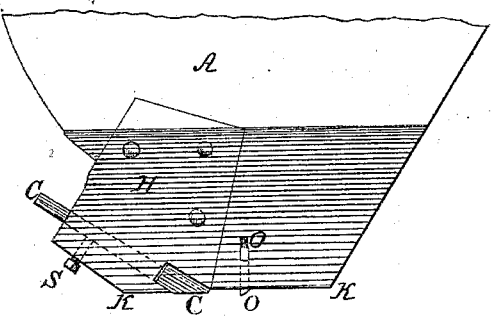
Figure 4:
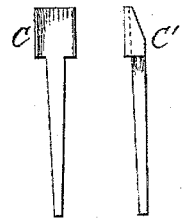

Figure 1 shows the concave surface of a cutter-arm to which my invention is attached; Fig. 2 shows a sectional view of the part illustrated by Fig. 1, cut through on line $a\ b$; Fig. 3 shows the convex surface of the cutter-arm to which my invention is attached; and Fig. 4 shows the cutter in two positions detached from the cutter-arm.

In the drawing, A represents the cutter-arm. The portion of the arm which is shaded in the drawing is made thicker than the other parts, and is designed to nearly fill the groove made by the cutter C, thereby acting as a guide and preventing any unsteady motion of the cutter-arm. In Fig. 1, H represents the cutter-holder. This holder is placed upon the convex side of the cutter-arm, as shown in Fig. 3, the dotted line E E in Fig. 1 being designed merely to indicate the position of the holder H. C C is the cutter, provided with a shank, as shown. In Fig. 1, D shows the position of the cutter-shank when placed in the holder H. T represents the throat through which the shaving cut by cutter C passes, thus clearing the cutter. The throat T is also shown in Fig. 2. The shank of the cutter is made in the form of a male dovetail, and fits into a dovetail groove provided in the cutter-holder, as shown in Fig. 2 by C. In said Fig. 2, C' shows the position of one side of the cutter when in position ready for use. S is a set-screw, so arranged as to press upon the cutter-shank and thereby hold the cutter firmly and securely in its place. By loosening the set-screw S the cutter may be readily adjusted to cut a greater or less depth into the stock, as may be required, and can easily be removed for the purpose of sharpening and repairing. O represents a spur fastened into the arm A so as to split the shaving, thereby allowing it more readily to pass through the throat T and clear the cutter.

Instead of using the dovetail groove to hold the cutter-shank, as above described, a hole of any shape in the holder might be substituted; but I deem the dovetail groove preferable.

The cutter-holder H may be attached to the cutter-arm in any suitable manner, or it may be a part of the arm itself—that is, the end of the arm A may be constructed in the form of the cutter-holder H, as already described.

Having thus described my invention, what I claim, and desire to secure by Letters Patent, is—

The adjustable wooden-bowl cutter C, provided with a shank, as hereinabove described, in combination with the cutter-holder H, substantially as and for the purposes above set forth.

HARVEY LOCKE.

Witnesses:
EDWARD TAGGART,
NIRAM A. FLETCHER.